(12) United States Patent
Thirumalai et al.

(10) Patent No.: US 8,046,372 B1
(45) Date of Patent: Oct. 25, 2011

(54) DUPLICATE ENTRY DETECTION SYSTEM AND METHOD

(75) Inventors: Srikanth Thirumalai, Clyde Hill, WA (US); Aswath Manoharan, Bellevue, WA (US); Mark J. Tomko, Seattle, WA (US); Grant M. Emery, Seattle, WA (US); Vijai Mohan, Bellevue, WA (US); Egidio Terra, Porto Alegre (BR)

(73) Assignee: Amazon Technologies, Inc., Reno, NV (US)

( * ) Notice: Subject to any disclaimer, the term of this patent is extended or adjusted under 35 U.S.C. 154(b) by 743 days.

(21) Appl. No.: 11/754,237

(22) Filed: May 25, 2007

(51) Int. Cl.
G06F 7/00 (2006.01)
G06F 17/30 (2006.01)

(52) U.S. Cl. ........................ 707/749; 707/750

(58) Field of Classification Search .................. 707/5, 6, 707/4, 750
See application file for complete search history.

(56) References Cited

U.S. PATENT DOCUMENTS

| | | | | |
|---|---|---|---|---|
| 4,849,898 A * | 7/1989 | Adi | | 707/5 |
| 5,062,074 A | 10/1991 | Kleinberger | | |
| 5,261,112 A | 11/1993 | Futatsugi | | |
| 5,666,442 A * | 9/1997 | Wheeler | | 382/209 |
| 5,835,892 A | 11/1998 | Kanno | | |
| 5,960,383 A * | 9/1999 | Fleischer | | 704/9 |
| 6,038,561 A * | 3/2000 | Snyder et al. | | 707/6 |
| 6,075,896 A | 6/2000 | Tanaka | | |
| 6,076,086 A | 6/2000 | Masuichi | | |
| 6,167,398 A * | 12/2000 | Wyard et al. | | 707/5 |
| 6,173,251 B1 | 1/2001 | Ito | | |
| 6,263,121 B1 * | 7/2001 | Melen et al. | | 382/305 |
| 6,484,168 B1 * | 11/2002 | Pennock et al. | | 707/999.002 |
| 6,606,744 B1 | 8/2003 | Mikurak | | |
| 6,810,376 B1 | 10/2004 | Guan | | |
| 6,961,721 B2 | 11/2005 | Chaudhuri | | |
| 7,113,943 B2 * | 9/2006 | Bradford et al. | | 707/4 |
| 7,155,427 B1 * | 12/2006 | Prothia et al. | | 707/694 |
| 7,346,839 B2 | 3/2008 | Acharya | | |

(Continued)

FOREIGN PATENT DOCUMENTS

EP 1 380 966 A2 1/2004

OTHER PUBLICATIONS

Ghahrmani, Z., and K.A. Heller, "Bayesian Sets," Advances in Neural Information Processing Systems 18 (2006), 8 pages.

(Continued)

Primary Examiner — Yicun Wu
Assistant Examiner — Pavan Mamillapalli
(74) Attorney, Agent, or Firm — Robert C. Kowert; Meyertons, Hood, Kivlin, Kowert & Goetzel, P.C.

(57) ABSTRACT

A computer system and method for determining whether the subject matter described in a received document is substantially similar to the subject matter of other documents in a document corpus, such that the received document can be considered a duplicate document. After receiving a first document, a set of tokens for the first document is generated. A non-fielded relevance search on a token index is executed. The relevance search returns a set of candidate duplicate documents with scores corresponding to each candidate document. For each candidate document with a score above a threshold, filtering is performed on each candidate document to determine whether each candidate document is a true duplicate of the first document. A set of candidate documents with a score above the threshold that were not disqualified as candidate documents is then provided.

38 Claims, 8 Drawing Sheets

U.S. PATENT DOCUMENTS

| | | | |
|---|---|---|---|
| 7,386,441 | B2 | 6/2008 | Kempe |
| 7,426,507 | B1 | 9/2008 | Patterson |
| 7,529,756 | B1 | 5/2009 | Haschart |
| 7,562,088 | B2 | 7/2009 | Daga |
| 7,567,959 | B2 | 7/2009 | Patterson |
| 7,599,914 | B2 | 10/2009 | Patterson |
| 7,599,930 | B1 * | 10/2009 | Burns et al. ............ 707/999.006 |
| 7,603,345 | B2 | 10/2009 | Patterson |
| 7,668,887 | B2 * | 2/2010 | Vella .............................. 707/706 |
| 2002/0016787 | A1 * | 2/2002 | Kanno ................................ 707/5 |
| 2003/0065658 | A1 * | 4/2003 | Matsubayashi et al. .......... 707/4 |
| 2003/0101177 | A1 * | 5/2003 | Matsubayashi et al. .......... 707/6 |
| 2005/0276479 | A1 * | 12/2005 | Goldberg et al. ............. 382/181 |
| 2006/0112128 | A1 | 5/2006 | Brants |
| 2006/0282415 | A1 | 12/2006 | Shibata |

OTHER PUBLICATIONS

"Google Sets," ©2007 Google, /labs.google.com/sets> [retrieved Feb. 13, 2008].

Bilenko, M., et al., "Adaptive Name Matching in Information Integration," IEEE Intelligent Systems 18(5):16-23, Sep./Oct. 2003.

Kilgarriff, A., "Using Word Frequency Lists to Measure Corpus Homogeneity and Similarity Between Corpora," Information Technology Research Institute Technical Report Series, ITRI-97-07, University of Brighton, U.K., Aug. 1997, 16 pages.

Ramos, J., "Using TF-IDF to Determine Word Relevance in Document Queries," Proceedings of the First Instructional Conference on Machine Learning (iCML-2003), Piscataway, N.J., Dec. 3-8, 2003, 4 pages.

* cited by examiner

DUPLICATE ENTRY DETECTION SYSTEM AND METHOD

BACKGROUND

One aspect associated with the widespread usage of networks generally, and the Internet particularly, has been the emergence of electronic marketplaces. An electronic marketplace is typically a network site that offers a consistent, seemingly united, electronic storefront to networked consumers. Typically, the electronic marketplace is hosted on the Internet as one or more Web pages, and viewed by a consumer via a networked computer. FIG. 1 is a pictorial diagram of an illustrative networked environment 100 that includes an electronic marketplace. In particular, the networked environment 100 includes a host server 102 that hosts the electronic marketplace 104. As indicated above, a typical electronic marketplace is comprised of one or more Web pages that are viewable on a consumer's computer via a Web browser. However, for illustration purposes, the electronic marketplace 104 is shown in FIG. 1 as residing "outside" of a client computer. Consumer computers, such as consumer computers 106-108, connect to the host server to access the electronic marketplace via a network 110, such as, but not limited to, the Internet. The electronic marketplace 104 allows consumers, via their client computers 106-108, to view and purchase items offered for sale or lease on the electronic marketplace.

In many instances, an electronic marketplace 104 includes items from many different vendors or suppliers. For example, as shown in FIG. 1, the electronic marketplace 104 offers items from vendors 112 and 114. Still further, these electronic marketplaces allow individuals to offer both new and used items to consumers via the electronic marketplace. To do so, the vendors/suppliers 112-114, as well as consumers, such as a consumer operating consumer device 108, provide descriptions of products to be offered on the electronic marketplace 104 to the host server 102. The illustrated descriptions include descriptions 120-124.

Naturally, if an item is offered through the electronic marketplace 104, all instances of that item from all vendors should be displayed to the consumer as various options of the same item rather than individual items that are viewed separately. Unfortunately, since individual vendors and consumer/sellers provide the host server 102 with their own descriptions of the products that they wish to sell, it becomes an onerous, manual task to determine which product descriptions reference the same items and which reference different items. For example, FIGS. 2A-2C present illustrative product description documents submitted from two separate vendors. As suggested by the illustration, document 202 of FIG. 2A includes a structured or fielded document with information organized in a structure, such as manufacturer 204, model number 206, screen size 208, case color 210, and a brief description 212. Document 220 of FIG. 2B is not structured or fielded, but rather a free-form paragraph description (typical of product descriptions provided by consumers) that includes important information. With regard to documents 202 and 220, and upon inspection of the two documents, a person familiar with the subject matter of laptops (or even one not quite so familiar) is likely to recognize that these two documents likely describe the same product. In other words, a person would recognize that the manufacturer ("HP") identified in the manufacturer field 204 and the name "Hewlett Packard" in text area 222 are a reference to the same manufacturer. Similarly, a person would likely recognize that the case color "BLK/SLVR" in the case color field 210 is the abbreviation for "Black/Silver" as recited in full in text area 224. From comparisons of other terms/fields, while not necessarily resulting in a letter-perfect match, a person would recognize the two documents as being substantially similar, i.e., describing the same or substantially the same product or subject matter. Moreover, if these descriptions were properly identified as duplicates (i.e., that the subject matter described by both documents is the same), a host server 102 would group them together as descriptions of a single product item.

Document 230 of FIG. 2C is a structured document and includes fields that are very similar to that of document 202. However, in contrast to document 202 (and to document 220), there are certain differences between the two that a person would likely recognize and conclude that they describe different products. For example, the case color field 232 recites "BLK/SLVR/GLD," adding an additional color to the case. Additionally, the product description 234 includes additional language, "limited edition," in text area 236 that would indicate that this laptop, in contrast to the one described in document 202, is somewhat different (i.e., a limited edition version) and not a duplicate.

Unfortunately, while a person can be trained to discern the differences between duplicate product descriptions, it is difficult for a computer to programmatically analyze two documents to determine whether or not they are duplicates (i.e., whether or not they describe the same product.) Clearly, this problem is exacerbated when the number of products offered by an electronic marketplace 104 (originating from a myriad of vendors) is measured in hundreds of thousands or more.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to aspects of the disclosed subject matter, a computer system and method for determining whether a received document is a duplicate of another document in a document corpus, such that the first document and the another document describe the same or substantially similar subject matter, is provided. With regard to a first document, a set of tokens for the first document is generated. Each token in the set of tokens represents a series of characters in the first document. A relevance search on a token index is executed. The token index comprises an index of tokens corresponding to series of characters in the documents of the document corpus. The relevance search returns a set of candidate documents with scores for each candidate document. For each candidate document with a score above a threshold, filtering is performed on each candidate document such that a candidate document that does not describe substantially similar subject matter is disqualified as a candidate document. A set of candidate documents with a score above the threshold that were not disqualified as candidate document is then provided.

According to alternative aspects of the disclosed subject matter, a computing system providing an electronic marketplace for offering products for sale from a plurality of providers and detecting duplicate product description documents from the plurality of providers is presented. The computing system comprises a processor, a memory, a document corpus comprising a plurality of documents, and a token index comprising tokens for the documents in the document corpus. The computing system is configured to, with regard to a first document: generate a set of tokens for the first document, each token in the set of tokens representing a series of characters found in the first document, and execute a relevance search on a token index, the token index comprising an index of tokens corresponding to strings in the documents of the document corpus, wherein the relevance search returns a set of candidate documents with scores for each candidate document. For each candidate document with a score above a threshold, the computing system performs filtering on the candidate document to determine whether the subject matter of the candidate document is substantially similar to the subject matter of the first document, and disqualify the candidate document they are not substantially similar. The computing system then provides a set of candidate documents with a score above the threshold that were not disqualified as candidate documents.

According to additional aspects of the disclosed subject matter, a networked computing system providing an electronic marketplace for offering products for sale from a plurality of providers and detecting duplicate product description documents from the plurality of providers is provided. The computing system comprises a processor, a memory, a document corpus comprising a plurality of documents, and a token index comprising tokens for the documents in the document corpus. The computing system is configured to, with regard to a first document, generate a set of tokens for the first document, each token in the set of tokens representing a series of characters found in the first document. The computing system is further configured to execute a relevance search on a token index, the token index comprising an index of tokens corresponding to strings in the documents of the document corpus, wherein the relevance search returns a set of candidate documents with scores for each candidate document. The computing system further refines the scores for each candidate document to include matching of non-identical terms not considered as matches in the non-fielded relevance search. For each candidate document with a score above a threshold, the computing system performs a domain specific comparison between the first document and the candidate document and disqualifies the candidate document if the candidate document is not substantially similar to the first document. The computing system further performs a variation detection evaluation on the first document and candidate document, and disqualifies the candidate document if the candidate document is not substantially similar to the first document. Finally, the computing system provides a set of candidate documents with a score above the threshold that were not disqualified as candidate documents.

According to yet further aspects of the disclosed subject matter, a tangible computer-readable medium is presented, the computer-readable medium bearing computer-executable instructions which, when executed on a computing device, carry out a method for determining whether a first document is a duplicate of another document in a document corpus. The method comprises generating a set of tokens for the first document. Each token in the set of tokens represents a series of characters found in the first document. A non-fielded relevance search is executed on a token index, the token index comprising an index of tokens corresponding to strings in the documents of the document corpus. The relevance search returns a set of candidate documents with scores for each candidate document. Thereafter, for each candidate document with a score above a threshold, performing a filtering on the candidate documents such that a candidate document that does not describe substantially similar subject matter is disqualified as a candidate document. The filtering comprises performing variation detection between the first document and a candidate document and disqualifying the candidate document if the candidate document is a mutually exclusive variation of the first document. The filtering further comprises performing domain specific comparisons between the first document and the candidate document and disqualifying a candidate document if the candidate document does not describe substantially similar subject matter as to the first document according to the results of the domain specific comparisons. After performing filtering, a set of candidate documents with a score above the threshold that were not disqualified as candidate documents is provided.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

By way of definition, a document corpus refers to a collection of documents. As used in this description, a document is a body of text generally directed to describing a particular subject matter. A typical, exemplary document might be a product description of digital camera, where the product description includes the camera's manufacturer, a product number, various technical features, cosmetic features, and the like. A document corpus may be stored in one or more data stores or catalogues. In the following discussion, the referred-to document corpus is a collection of product descriptions of products offered for sale by various providers. The product descriptions are generally provided to a host server 102 conducting an electronic marketplace 104 for consumers.

By way of further definition, while the following discussion will frequently be made in regard to determining whether a first document is substantially similar to another document in a document corpus and therefore considered a duplicate, this is a shorthand reference to determining whether the subject matter described by a first document is the same or substantially the same subject matter described by another document in the document corpus. As suggested above, for purposes of simplicity and clarity in describing the disclosed subject matter, when the subject matter described by one document is the same or substantially similar to the subject matter described by another document or documents, these documents are said to be "duplicates."

Generally speaking, there are two aspects for determining whether or not a given document is substantially similar to another document in the document corpus (i.e., the subject matter described by a first document is the same as the subject matter described by another document): identification and precision. Identification refers to identifying documents in the document corpus that are candidate duplicate documents. Precision refers to the accuracy of identifying only true duplicates of a given document. Quite frequently, in order to ensure that actual or true duplicates for a first document are found among the documents in a document corpus, it is often desirable to be "aggressive" in selecting candidate duplicate documents such that there are several candidates that are not duplicates, i.e., false positives. Stated differently, identification should select a duplicate (provided a duplicate exists in the document corpus) nearly 100% of the time, at the expense of including candidate documents that are not true duplicates. According to aspects of the disclosed subject matter, to improve the precision (i.e., the accuracy of identifying only true duplicates), after aggressively identifying candidate documents, filters may be applied to "weed out" the non-duplicate candidate documents.

Figure 1:
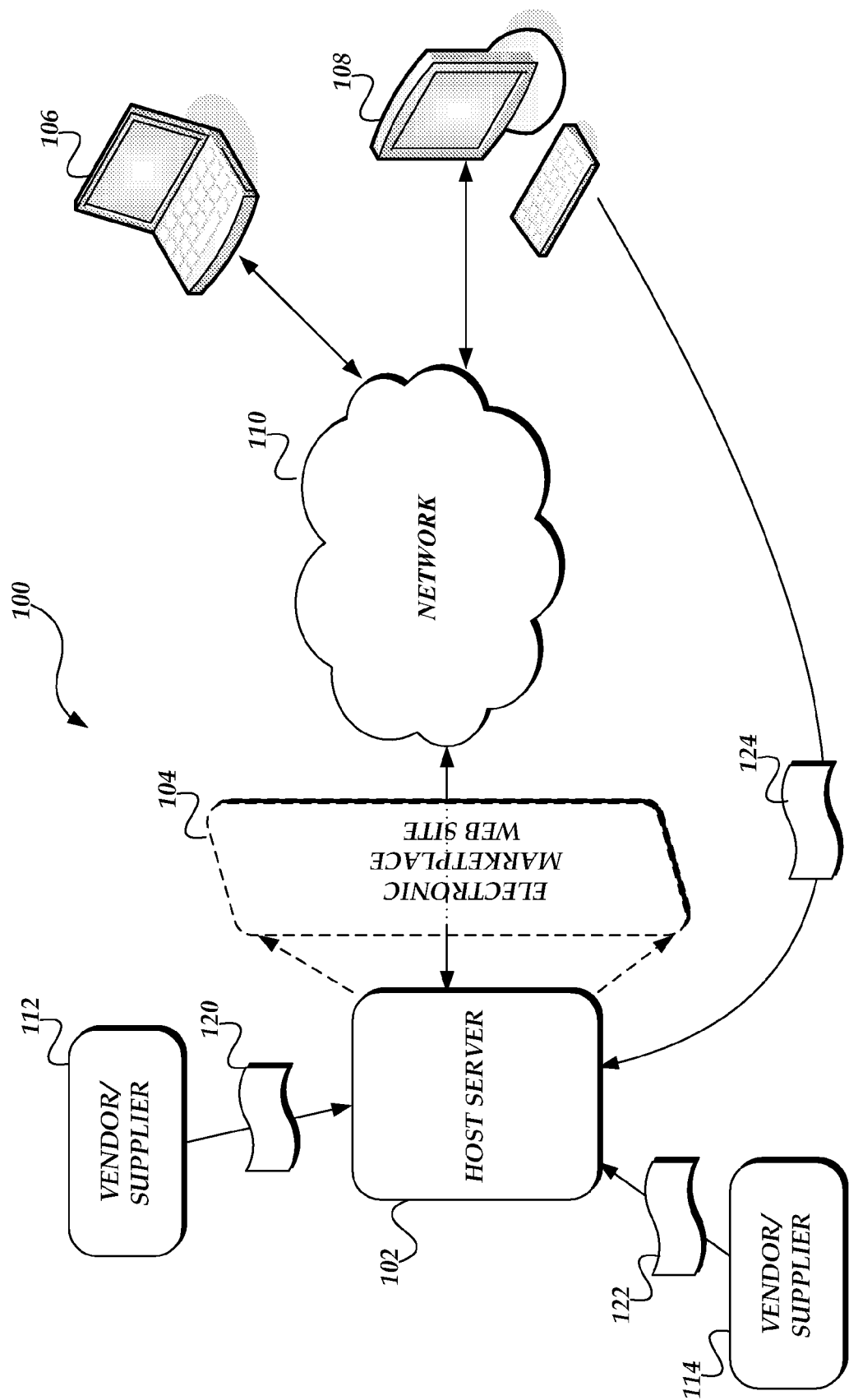
FIG. 1 is a pictorial diagram of an illustrative networked environment providing an electronic marketplace.
Figure 2C:
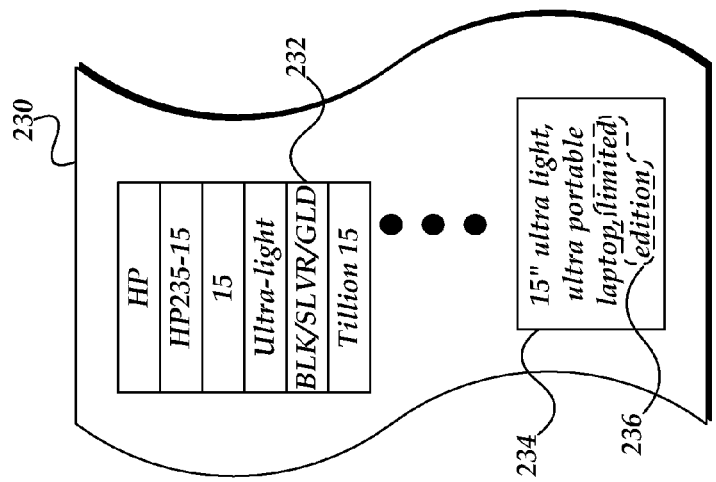
FIGS. 2A-2C are representative document descriptions regarding products from vendors, suitable for illustrating documents describing similar and dissimilar products.
Figure 2B:
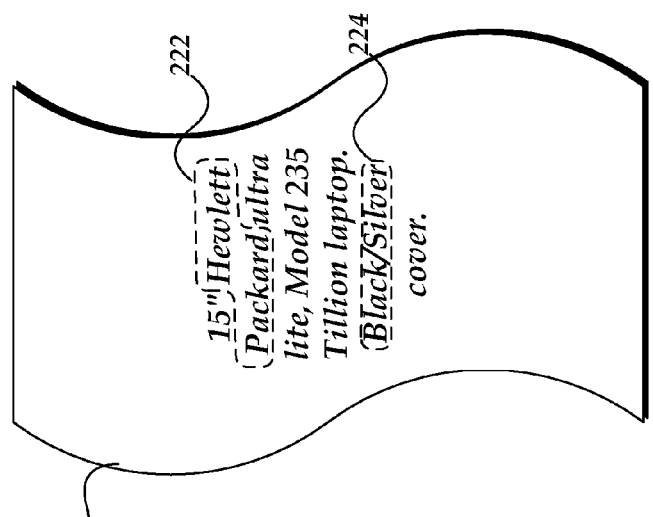
Figure 2A:
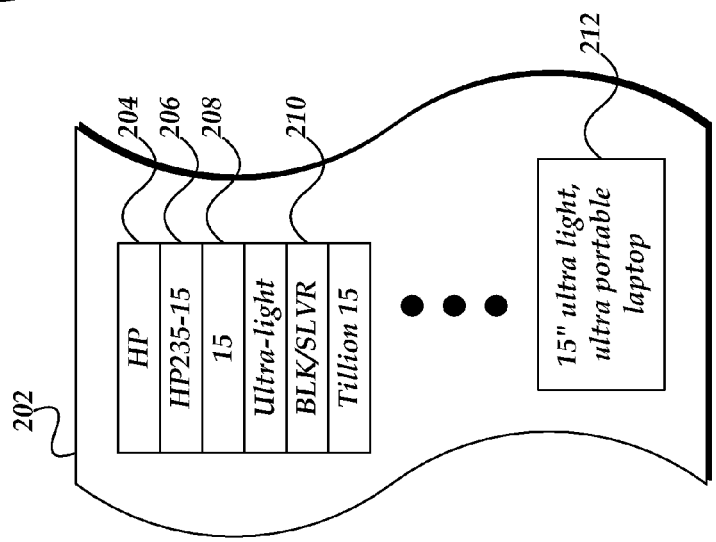
Figure 3:
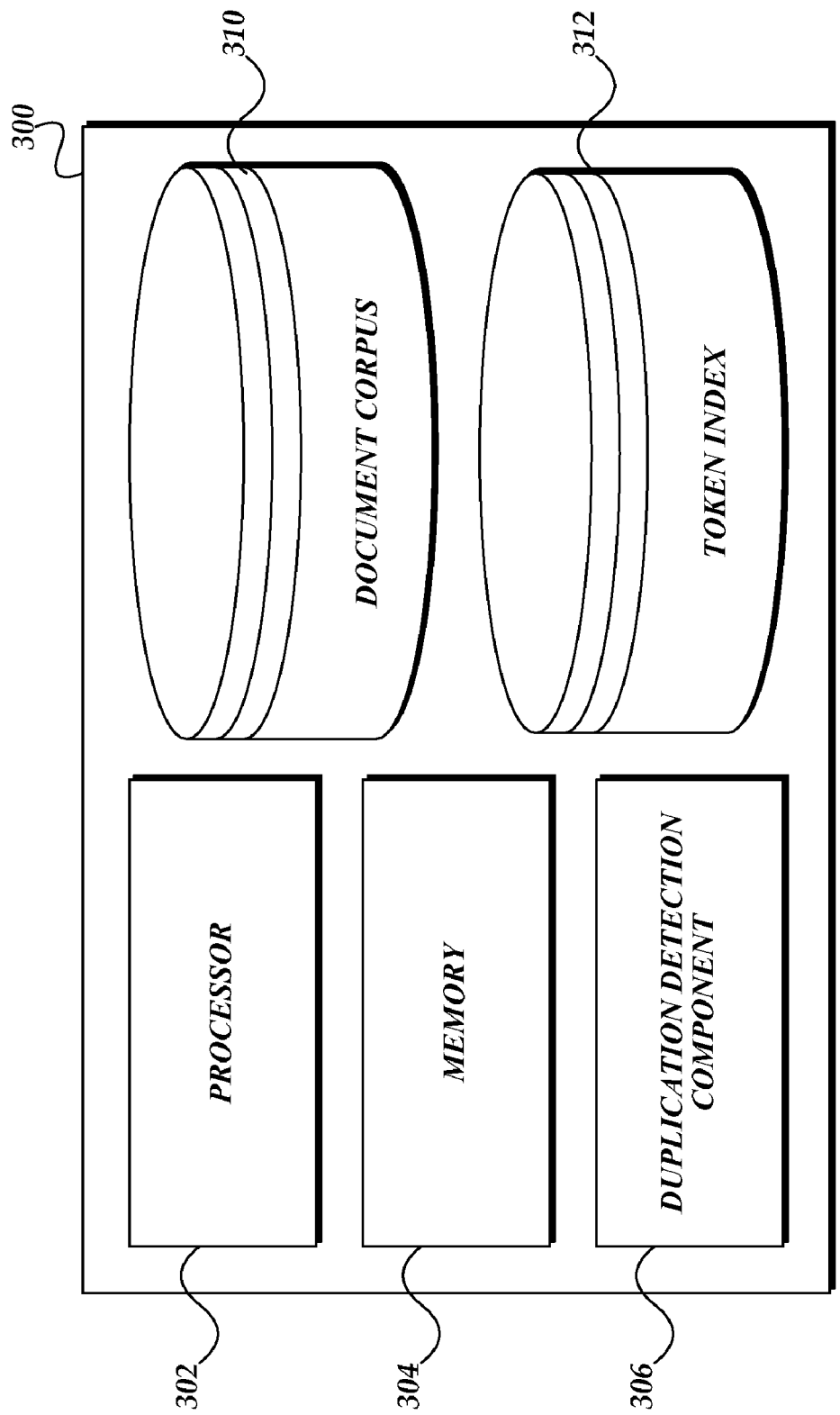
FIG. 3 is a block diagram illustrating logical components of a computer system suitable for determining whether a submitted document is substantially similar to another document and therefore considered a duplicate, in accordance with one or more embodiments of the disclosed subject matter.

FIG. 3 is a block diagram illustrating logical components of a computer system 300 suitable for detecting whether a first document is a duplicate of one or more other documents in a document corpus. Prior to discussing these components, it should be appreciated that the components described herein are logical components, not necessarily actual components. In an actual embodiment, any one of the logical components may be embodied in one or more discrete actual components, and/or combined with several components.

The computer system 300 includes a processor 302 for executing instructions to determine whether a first document is substantially similar to another document in a document corpus. The processor executes instructions from a memory 304 that may be comprised of random access memory (RAM), read-only memory (ROM), disk storage, remote online storage, and the like. The computer system is illustrated as also including a duplicate detection component 306 which is used by the computer system 300 to detect whether a first document is substantially similar to another document in a document corpus. Of course, in an actual embodiment, the duplicate detection component 306 may be implemented as a hardware component, a software component (stored in the memory 304), a combination of hardware and software, a service provided by another computing device, and the like.

The computer system 300 is also illustrated as including a document corpus 310. As indicated above, the document corpus is a collection of documents, such as documents describing a product or service for sale. This document corpus may be organized in a database, such as illustrated in FIG. 3, but it is not necessary to be in a database. It may be, however, important to be able to access the documents in the document corpus when identifying and filtering for duplicates, as will be described in more detail below. While the document corpus 310 is illustrated as being a part of the computer system 300, in an actual embodiment, the document corpus 310 may be stored external, yet accessible, to the computer system 300.

The computer system 300 is also illustrated as including a token index 312. As will be described below, the token index corresponds to an index of tokens (including alphabetic strings, numbers, and alpha-numeric strings) from the various documents in the document corpus 310. As is common with indices, the token index 312 will typically include information such as, but not limited to, the frequency of a token in each document, references to the documents for each token, the document field in which the token is found, and the like. As with the document corpus 310, while illustrated as a logical component of the computer system 300, in an actual embodiment the token index 312 may be incorporated in the computer system which is otherwise accessible to the computer system for use in determining whether a document is substantially similar to one or more documents in a document corpus 310, and therefore considered to be a duplicate document. Further still, the index, while suggestively illustrated as being stored in a database, may be formed and maintained in an manner according to the needs of the implementing system.

Figure 4:
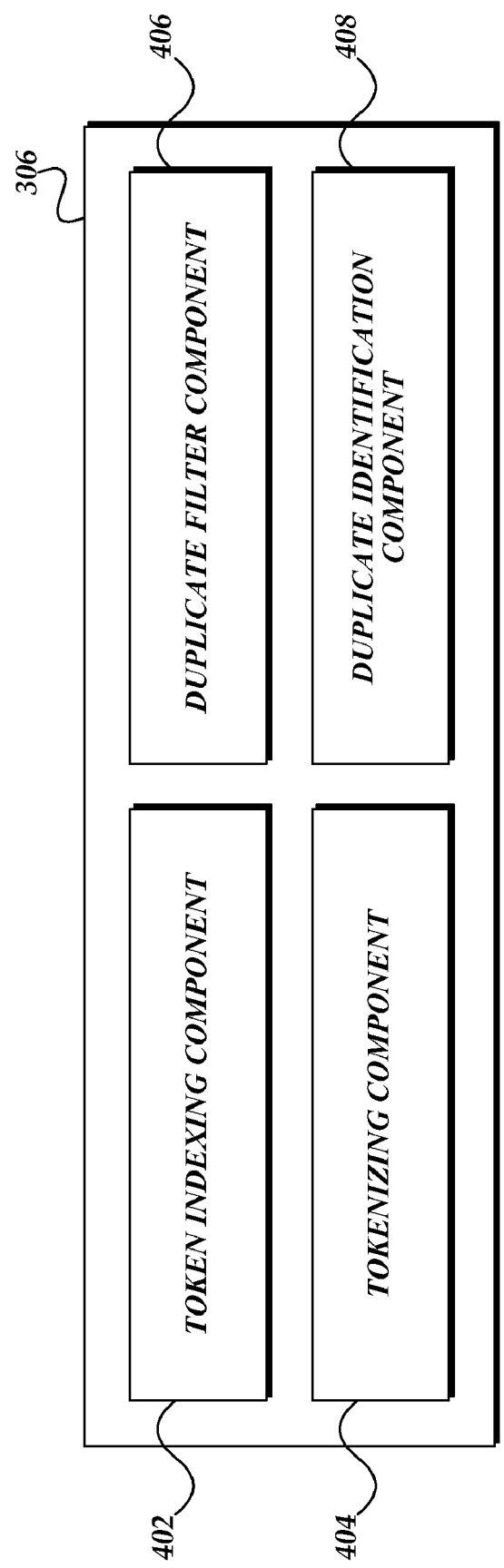
FIG. 4 is a block diagram illustrating logical components of duplicate detection component, as introduced in regard to the host server of FIG. 3, for detecting duplicate document descriptions submitted to the host server, in accordance with one or more embodiments of the disclosed subject matter.

Turning again to the duplicate detection component 306, it should be appreciated that this component may be broken down into its own logical components. To that end, FIG. 4 is a block diagram illustrating logical components of a duplicate detection component 306 formed according to the disclosed subject matter. As shown in FIG. 4, the duplicate detection component 306 includes a token indexing component 402, a tokenizing component 404, a duplicate filter component 406, and a duplicate identification component 408. Of course, it should be appreciated that while a duplicate detection component 306 would include these logical components, in an actual embodiment, there may be additional components not described herein. Further still, each of the above-described components may be combined in one or more of the logical components. Accordingly, the logical divisions shown in FIG. 4 should be viewed as illustrative only, and not viewed as limiting upon the disclosed subject matter.

The token indexing component 402 is used to generate the token index 312 described above, using tokens generated by the tokenizing component 404. The tokenizing component 404 parses a document to identify discrete alphabetic, alpha-numeric, and numeric stings, and converts the identified strings into a set of tokens. The duplicate filter component 406 filters candidate duplicate documents identified by the duplicate identification component 408 to eliminate those candidates that are not true duplicates of (i.e., are not substantially similar to) a first document. Finally, as suggested, the duplicate identification component 408 identifies potential duplicates, referred to as candidate duplicate documents or, more simply, candidate documents, of a given document in the document corpus 310.

To better illustrate the operation of the various components described in both FIGS. 3 and 4, reference is made to various flow diagrams. As suggested above, the duplicate detection component 306 determines whether a given document, such as a product description offered by a vendor/consumer, is a duplicate of another document in a document corpus 310. This determination is made, at least in part, by use of the token index 312. Accordingly, FIG. 5 is a flow diagram of an illustrative routine 500 for generating a token index 312 from the documents of a document corpus 310, in accordance with one or more embodiments of the disclosed subject matter.

Figure 5:
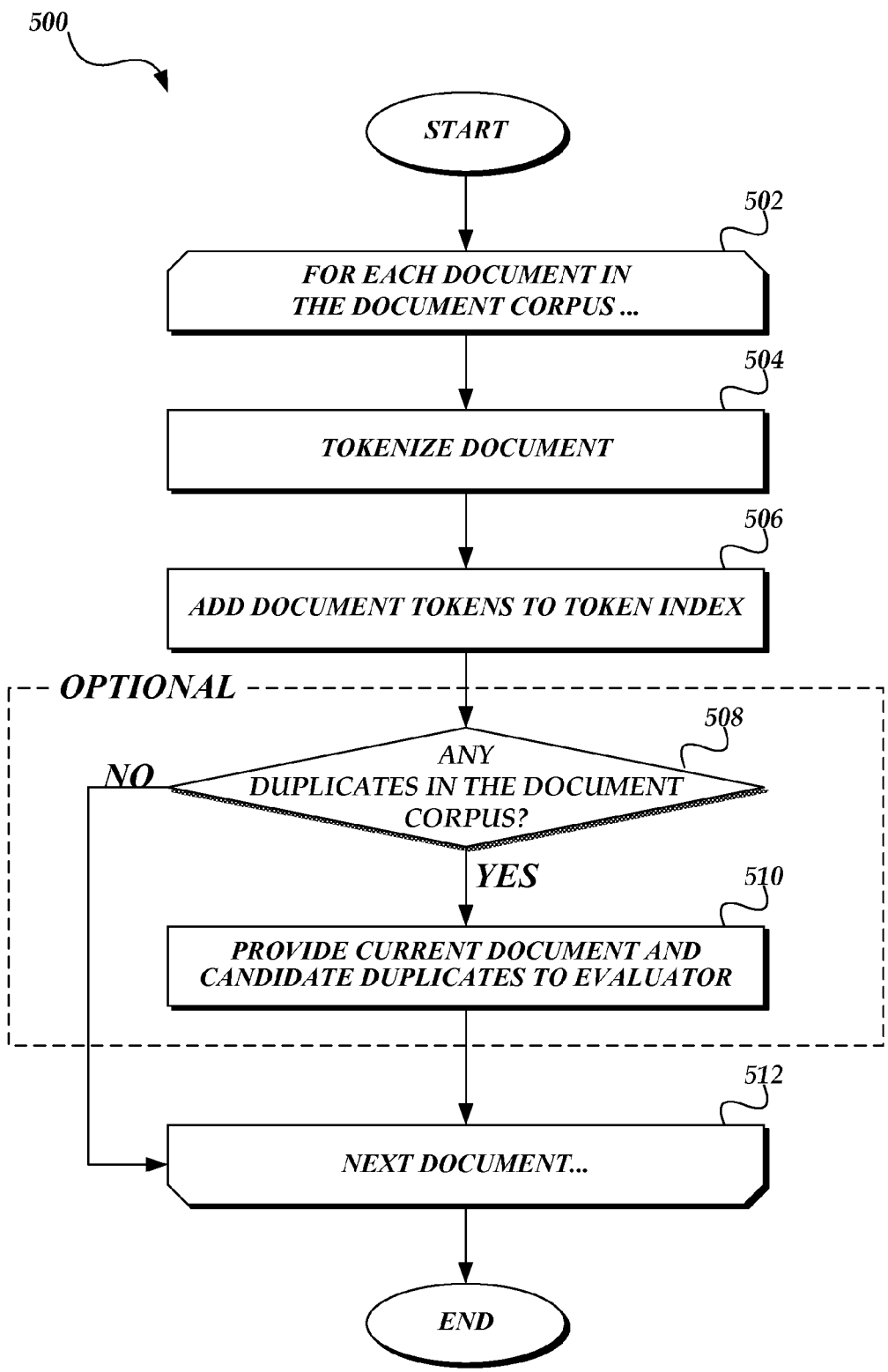
FIG. 5 is a flow diagram of an illustrative routine for preparing an index of a document corpus for use in duplicate detection according to aspects and embodiments of the disclosed subject matter.

As shown in FIG. 5, control block 502 is the beginning of an iterative process that loops through each of the documents (i.e., "for each document") in the document corpus 310 in order to generate the token index 312. This iterative process includes all of the steps 504-510 between the start of the loop 502 and end control block 512. Thus, for a given document in the document corpus 310, at block 504, the document is tokenized. As indicated already, tokenizing a document comprises generating a set of tokens, each corresponding to a string of characters in the document, including alphabetic strings, alpha-numeric strings, and numeric strings. Only one token is generated for a unique set or string of characters such that if the same string occurs more than once in the document, only one token for that string will be generated (though the number of occurrences of that string in the document may be noted.) After generating a set of tokens for the document, at block 506, the set of tokens for the document are added to the token index 312.

At this point, if the assumption can be made that there are no duplicates already in the document corpus 310, the process can skip the next two steps which are directed to detecting duplicates in those documents already indexed. Hence, the steps at decision block 508 and block 510 are identified as being optional. Alternatively, however, assuming that it would be good to verify that there are not already duplicates in the document corpus, the routine 500 proceeds to decision block 508 where a determination is made as to whether there are any duplicates of the current document in the document corpus. Determining whether there are one or more duplicates of the document in the document corpus 310 is described in greater detail below in regard to FIGS. 7A and 7B. If the there are one or more duplicates of the current document in the document corpus 310, at block 510 the set of candidate documents and the current document may be provided to an evaluator for final determination as to whether they are, in fact, duplicates. Moreover, should the evaluator determine that at least some of the documents are duplicates, the evaluator may associate the documents in the document corpus 310 as referencing or describing the same product. Thereafter, or if there are no candidate documents for the current document, the process 500 moves to end control block 512 that causes a return to control block 502 where the process iterates to the next document in the document corpus 310. This repetition continues until the process 500 has iterated through all of the documents in the document corpus 310, and then terminates.

Figure 6:
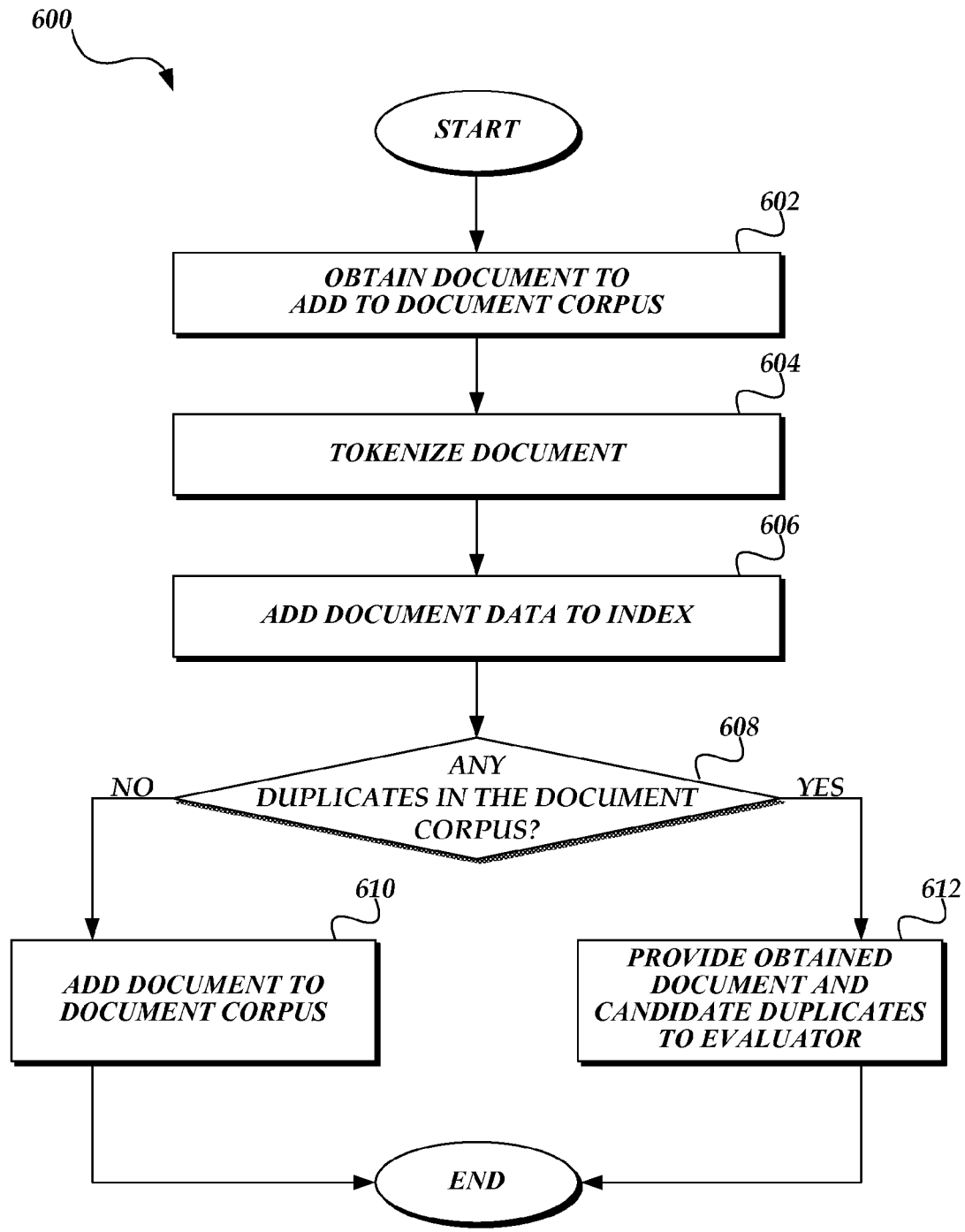
FIG. 6 is a flow diagram of an illustrative routine for determining whether a submitted document is substantially similar to one or more other documents in a document corpus and, therefore, considered a duplicate, in accordance with one or more embodiments of the disclosed subject matter.

In contrast to indexing the documents in the document corpus 310 as described in regard to FIG. 5, FIG. 6 is a flow diagram of an illustrative routine 600 for detecting and identifying candidate documents when receiving and adding a new document to the document corpus 310, in accordance with one or more embodiments of the disclosed subject matter. Beginning at block 602, a document for addition to the document corpus 310 is obtained. At block 604, the obtained document is tokenized, yielding a set of tokens for the obtained document as discussed above. At block 606, the obtained document is added to the token index 312.

Figure 7A:
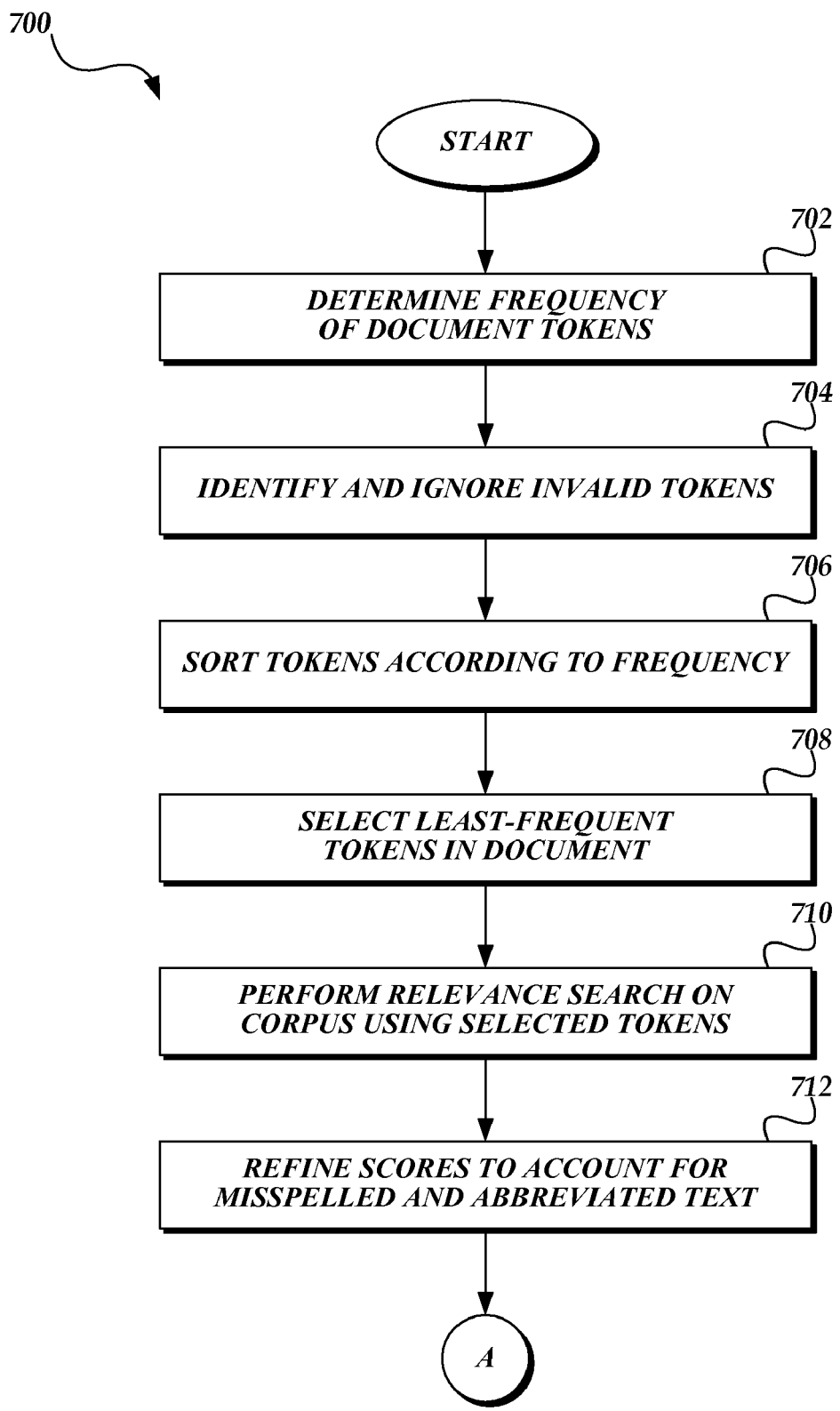
FIGS. 7A-7B are a flow diagram of an illustrative routine for identifying candidate duplicate documents for a submitted document and filtering out false duplicates from the candidate documents, in accordance with one or more embodiments of the disclosed subject matter.

At decision block 608, a determination is made as to whether or not the obtained document is substantially similar to, and therefore considered a duplicate of, one or more other documents in the document corpus 310, as described below in regard to FIGS. 7A and 7B. If it is determined that the obtained document is not substantially similar to (and therefore not a duplicate of) other documents in the document corpus 310, at block 610 the document is simply added as a new item to the document corpus. Alternatively, if it is determined that the document may be a duplicate of one or more other documents already in the document corpus 310, at block 612 the obtained document and the set of candidate documents identified as potential duplicates are provided to an evaluator. As above, should the evaluator determine that at least some of the candidate duplicate documents are, in fact, substantially similar and therefore considered duplicates of the obtained document, the evaluator may associate the those duplicates in the document corpus 310. After providing the obtained document to the evaluator, the routine 600 terminates.

As mentioned above, FIGS. 7A and 7B are of a flow diagram of an illustrative routine 700 for determining a set of candidate documents (if any) for a current document from the documents in the document corpus 310, in accordance with one or more embodiments of the disclosed subject matter. Beginning at block 702, from the token information generated for the current document, the frequency of the tokens in the current document (i.e., the number of occurrences of the string represented by each token in the current document) is determined. At block 704, invalid tokens (such as misspellings, inadvertent entries, and the like) are identified and eliminated from evaluation. Eliminating invalid tokens ensures a greater likelihood of properly identifying candidate duplicate documents. What remains are valid tokens with their associated occurrence frequency.

At block 706, the tokens are sorted according to their frequency in the current document. At block 708, one or more of the least frequent tokens from the current document are selected. The actual number of tokens selected may be based on a threshold percentage of the total number of tokens in the document, on an absolute threshold number, or according to a particular threshold frequency. Other heuristics for selecting the tokens may further be used, all of which are contemplated as falling within the scope of the disclosed subject matter. Further still, the various thresholds and/or heuristics for selecting the least frequently occurring tokens from the current document may be user configurable.

At block 710, using the selected tokens, a relevance search is performed on the token index 312. As those skilled in the art will appreciate, a relevance search, as used in this context, matches the selected tokens of the current document to other documents in the document corpus having all or some of the same tokens. Moreover, a relevance search generates a score between the current document and another document (based on the amount of search tokens that are found in common with each of the other documents). Still further, a relevance search generates scores based on exact matches between tokens. As indicated above, some documents may include structural or field information. While comparing tokens of similar fields may provide useful information, it should be appreciated that the relevance search of block 710 is an un-fielded search, i.e., the relevance search is made irrespective of any field relation information.

After the relevance search, recognizing the relevance score is based on exact matches and that many of the tokens may be matches but for being slightly misspelled or abbreviated, at block 712 the scores returned from the relevance search are refined to account for such common entry differences, resulting in improved scores (i.e., the likelihood that a candidate document is a duplicate) that more accurately reflect the relevance between the candidate duplicate documents and the current document.

Figure 7B:
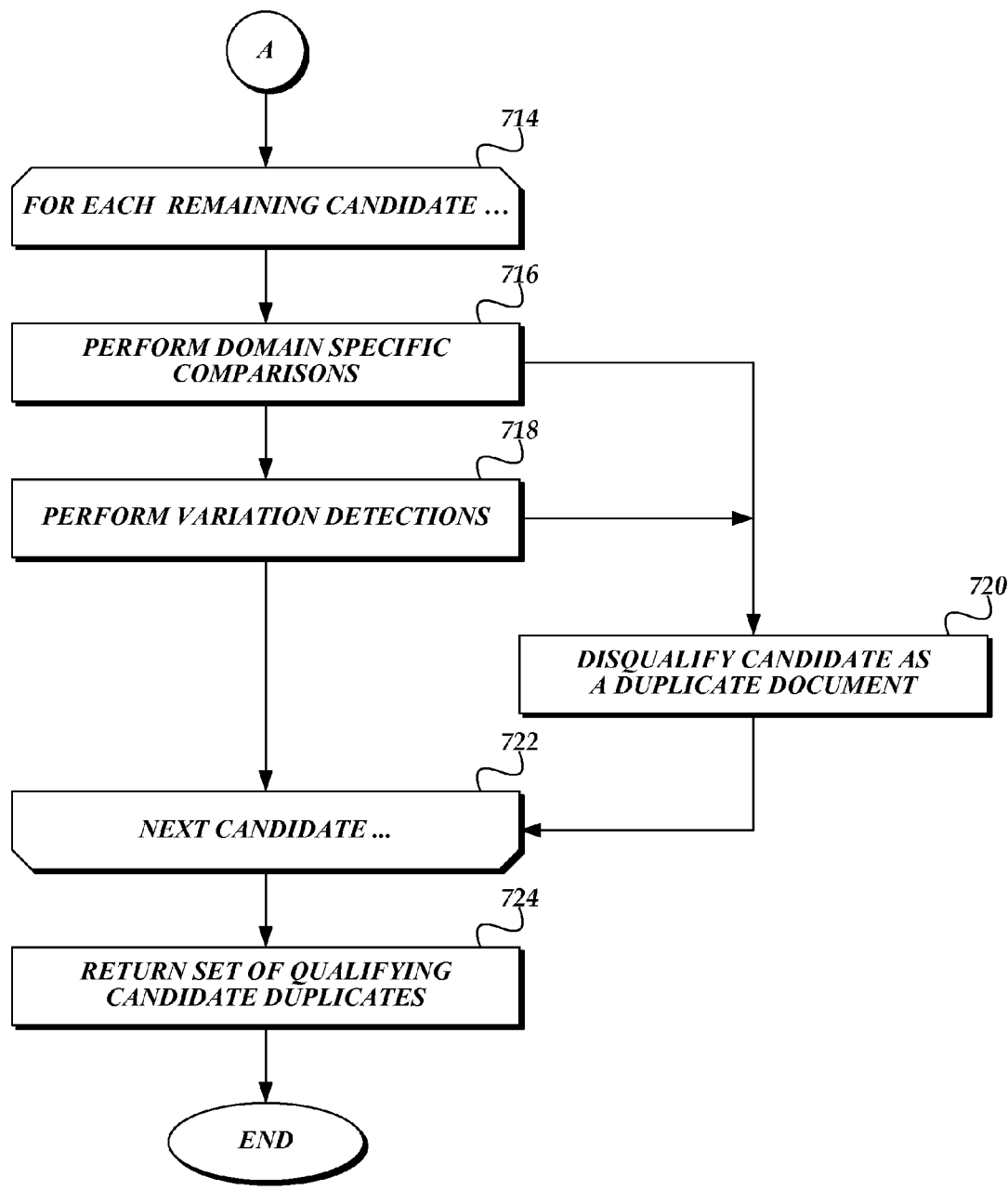

Turning now to FIG. 7B, at control block 714 a looping construct is begun that iterates through the results/candidate documents identified by the previous steps. More particularly, the looping construct iterates through those candidate documents whose score exceeds a predetermined threshold value. Thus, for each identified candidate document with a score above a threshold value, steps 716-720 may be executed. Blocks 716 and 718 identify various filters that may be applied to each candidate document to determine, to a greater degree, whether a candidate document may be a true duplicate of the current document (such that it describes the same or substantially the same subject matter.) At end control block 724, the next candidate document with a score above a given threshold is selected and the loop is repeated. When there are no additional candidate documents with a resulting score above the predetermined threshold, the routine 700 proceeds to block 724.

With regard to the filtering steps 716 and 718, in contrast to the relevance search of block 710, at block 716 domain specific (or fielded) comparisons are made between information in the current document and the selected candidate document. Domain specific comparisons are directed to types (or domains/fields) of information in each document when present and identifiable in the documents. These domains include merchant source (i.e., whether the source of the current document is the same as the source for the selected candidate document); package quantities; UPC or product identification values; manufacturer, and the like. As an additional domain specific comparison, a comparison as to the source of both documents (the current document and the candidate document) is made. If the source of the current document and the candidate document is the same, i.e., submitted by the same merchant, an assumption that a merchant would not provide duplicate documents implies that the products described by the two documents are different. Alternatively, if the package quantities, the UPC values, or the manufacturers differ, then the current document and the selected candidate document are not duplicates (i.e., describe different products). If the domain comparisons of block 716 show that the documents are not duplicates, the process 700 proceeds to block 720 where the candidate document is disqualified as a duplicate of the current document.

If the candidate duplicate document is not disqualified as a duplicate document based on domain comparisons, at block 718 variation detections are performed on the candidate document and the current document to determine whether the two documents include mutually exclusive variations such that, while similar, the described subject matter cannot be said to be true duplicates. Examples of such mutually exclusive variations may include the case color (e.g., pink, black, blue, or red) of an otherwise similar portable media player. Accordingly, if the current document and candidate duplicate documents are determined to be such variations, they are not considered duplicates and the routine 700 proceeds to block 720 where the candidate document is disqualified as a duplicate of the current document. If the candidate document has not been disqualified, or after disqualifying the candidate document as a duplicate, the routine 700 proceeds to end control block 722.

At block 724, after processing each candidate document having a score above a given threshold, the set of candidate documents that have not been disqualified as duplicates are returned as the results of the routine 700, and the routine terminates.

It should be appreciated, that while the above described routine 700 (as well as all other routines) illustrate a particular order, those skilled in the art will recognize that various modifications may be made to the order without departing from the scope and intent of the disclosed subject matter.

While the above description has generally been made with regard to determining whether a given document described the same or substantially similar product as described in another document in a document corpus, it should be appreciated that the inventive aspects of the disclosed subject matter may be suitably and beneficially applied to determining duplicate documents generally (based on the subject matter of the content). It should be further appreciated that the various methods described above may be located on a computer-readable medium as executable modules and/or instructions, including media such as DVD-ROMs, CD-ROMs, hard disk drives, flash drives, and the like, for execution on any number of computing devices.

While various embodiments have been illustrated and described, it will be appreciated that various changes can be made therein without departing from the spirit and scope of the invention.

The embodiments of the invention in which an exclusive property or privilege is claimed are defined as follows:

1. A computer-implemented method for determining a set of duplicate documents describing subject matter similar to subject matter described by a first document, the method comprising, under control of instructions executed by one or more computing devices:
   generating a set of tokens for the first document, each token in the set of tokens representing a series of characters found in the first document;
   selecting one or more tokens of the set of tokens having an occurrence frequency in the first document lower than a frequency threshold;
   executing a non-fielded relevance search on a token index using the selected one or more tokens, wherein the token index comprises an index of tokens corresponding to strings in documents of a document corpus, and wherein the non-fielded relevance search returns candidate documents from the document corpus with scores for each candidate document;
   for each candidate document with a score above a scoring threshold, performing filtering on the candidate document and disqualifying the candidate document if the candidate document is a mutually exclusive variation of the first document, wherein the mutually exclusive variation indicates that, while otherwise similar to the first document, the candidate document is not a duplicate of the first document; and
   providing the set of duplicate documents, wherein the set of duplicate documents includes candidate documents that have scores above the scoring threshold and that have not been disqualified.

2. The method of claim 1 further comprising updating the scores of the candidate documents to reflect matching between abbreviated character strings and corresponding non-abbreviated character strings, wherein said matching is not reflected by a score based on an exact match between the abbreviated character strings and the corresponding non-abbreviated character strings.

3. The method of claim 2 further comprising updating the scores of the candidate documents to reflect matching between misspelled character strings and corresponding non-misspelled character strings, wherein said matching is not reflected by a score based on an exact match between the misspelled character strings and corresponding non-misspelled character strings.

4. The method of claim 1, wherein the character strings comprise alphabetic, alpha-numeric, and numeric strings.

5. The method of claim 1, wherein performing filtering on each candidate document comprises performing domain specific comparisons between the first document and the candidate document to determine whether the candidate document describes similar subject matter as described in the first document.

6. The method of claim 5, wherein the domain specific comparisons include comparing product numbers from the first document and the candidate document.

7. The method of claim 5, wherein the domain specific comparisons include comparing package quantities identified in the first document to package quantities identified in the candidate document.

8. The method of claim 5, wherein the domain specific comparisons include comparing the provider of the first document to the provider of the candidate document.

9. The method of claim 1, wherein performing filtering on the candidate document comprises performing variation detection to determine whether the first document describes the mutually exclusive variation of the subject matter of the candidate document.

10. The method of claim 1, wherein the score for each candidate document corresponds to a determined likelihood of the candidate document being a duplicate of the first document.

11. A networked computing system providing an electronic marketplace for offering products for sale from a plurality of providers and detecting duplicate product description documents from the plurality of providers, the networked computing system comprising:
   a processor; and
   a memory;
   wherein the networked computing system is configured to, upon receiving a first document:
      generate a set of tokens for the first document, each token in the set of tokens representing a series of characters found in the first document;
      select one or more tokens of the set of tokens having an occurrence frequency in the first document less than a threshold frequency;
      execute a non-fielded relevance search on a token index using the selected one or more tokens, the token index comprising an index of tokens corresponding to strings in documents of a document corpus, wherein the non-fielded relevance search returns candidate documents from the document corpus with scores for each candidate document;
      for each candidate document with a relevance score above a scoring threshold, perform filtering on the candidate document and disqualify the candidate document if the candidate document is a mutually exclusive variation of the first document, wherein the mutually exclusive variation indicates that, while otherwise similar to the first document, the candidate document is not a duplicate of the first document; and
      provide a set of duplicate documents in which each duplicate document has a score above the scoring threshold and has not been disqualified.

12. The computer system of claim 11, wherein the computer system is further configured to update the scores of the candidate documents to reflect matching between abbreviated character strings and corresponding non-abbreviated character strings, wherein said matching is not reflected by a score based on an exact match between the abbreviated character strings and the corresponding non-abbreviated character strings.

13. The computer system of claim 12, wherein the computer system is further configured to update the scores of the candidate documents to reflect matching between misspelled character strings and corresponding non-misspelled character strings, wherein said matching is not reflected by a score based on an exact match between the misspelled character strings and corresponding non-misspelled character strings.

14. The computer system of claim 11, wherein the character strings comprise alphabetic, alpha-numeric, and numeric strings.

15. The computer system of claim 11, wherein performing filtering on each candidate document comprises performing domain specific comparisons between the first document and the candidate document to determine whether the candidate document describes similar subject matter as described in the first document.

16. The computer system of claim 15, wherein the domain specific comparisons comprise comparing product numbers from the first document and the candidate document.

17. The computer system of claim 15, wherein the domain specific comparisons comprise comparing package quantities identified in the first document to package quantities identified in the candidate document.

18. The computer system of claim 15, wherein the domain specific comparisons comprise comparing the provider of the first document to the provider of the candidate document.

19. The computer system of claim 11, wherein performing filtering on the candidate document comprises performing variation detection to determine whether the first document describes the mutually exclusive variation of the subject matter of the candidate document.

20. The computer system of claim 11, wherein the score for each candidate document corresponds to a determined likelihood the candidate document is a duplicate of the first document.

21. A networked computing system providing an electronic marketplace for offering products for sale from a plurality of providers and detecting duplicate product description documents from the plurality of providers, the networked computing system comprising:
   a processor; and
   a memory;
   wherein the networked computing system is configured to, with regard to a first document:
      generate tokens for the first document, each generated token representing a series of characters found in the first document;
      execute a non-fielded relevance search on a token index, the token index comprising an index of tokens corresponding to strings in documents of a document corpus, and wherein the relevance search returns candidate documents with corresponding scores for each candidate document;
      refine the scores for each candidate document to include matching of non-identical terms not considered as matches in the non-fielded relevance search;
      for each candidate document with a relevance score above a threshold:
         identify a set of tokens from the first document associated with a type of information contained in the subject matter of the first document;
         identify a corresponding set of tokens from the candidate document associated with a matching type of information contained in the subject matter of the second document;
         compare the set of tokens from the first document to the set of tokens from the candidate document;

disqualify the candidate document if the comparison indicates the candidate document does not describe subject matter similar to the subject matter of the first document;

perform a variation detection evaluation between the first document and the candidate document; and disqualify the candidate document if the candidate document is a mutually exclusive variation of the first document, wherein the mutually exclusive variation indicates that, while otherwise similar to the first document, the candidate document is not a duplicate of the first document; and provide a set of duplicate documents in which each duplicate document has a score above the threshold and has not been disqualified.

22. The computing system of claim 21, wherein executing the non-fielded relevance search on the token index comprises executing the non-fielded relevance search on the token index using the least frequently occurring tokens of the generated set of tokens for the first document.

23. The computing system of claim 21, wherein the computing system is further configured to sort the generated set of tokens for the first document according to an occurrence frequency in the first document, select tokens with an occurrence frequency lower than a frequency threshold, and execute the non-fielded relevance search on the token index using the selected tokens.

24. The computing system of claim 21, wherein refining the scores for each candidate document to include matching of non-identical terms not considered as matches in the non-fielded relevance search comprises refining the scores for each candidate document to include matching of abbreviated and non-abbreviated character strings.

25. The computing system of claim 21, wherein refining the scores for each candidate document to include matching of non-identical terms not considered as matches in the non-fielded relevance search comprises refining the scores for each candidate document to include matching of misspelled and non-misspelled character strings.

26. The computing system of claim 21, wherein the type of information contained in the subject matter of the first document and the matching type of information contained in the subject matter of the second document are product numbers, and wherein comparing the set of tokens from the first document to the set of tokens from the candidate document comprises comparing a product number from the first document to a product number from the candidate document.

27. The computing system of claim 21, wherein the type of information contained in the subject matter of the first document and the matching type of information contained in the subject matter of the second document are package quantities, and wherein the computing system is further configured to compare package quantities identified in the first document to package quantities identified in the candidate document.

28. The computing system of claim 21, wherein the computing system is further configured to compare a provider of the first document to a provider of the candidate document, and if the provider of the first document is similar to the provider of the second document, to disqualify the candidate document as a candidate document.

29. The computing system of claim 21, wherein the score for each candidate document corresponds to a determined likelihood the candidate document is similar to and considered a duplicate of the first document.

30. A tangible computer-readable medium bearing computer-executable instructions which, when executed on a computing device, cause the computing device to carry out operations comprising:

generating tokens for the first document, each token representing a series of characters found in the first document;

executing a non-fielded relevance search on a token index, the token index comprising an index of tokens corresponding to strings in documents of a document corpus, wherein the relevance search returns candidate documents with scores for each candidate document;

refining the scores for each candidate document include matching of non-identical terms not considered as matches in the non-fielded relevance search;

for each candidate document with a score above a threshold, performing filtering on the candidate document and disqualifying as a candidate document each candidate document not describing subject matter similar to subject matter of the first document, wherein the filtering comprises:

performing a variation detection between the first document and a candidate document and disqualifying the candidate document if the candidate document is a mutually exclusive variation of the first document, wherein the mutually exclusive variation indicates that, while otherwise similar to the first document, the candidate document is not a duplicate of the first document; and performing domain specific comparisons between the first document and the candidate document by:

identifying, from the first document, a first set of tokens associated with a field of the first document, the field of the first document associated with a type of information;

identifying, from the second document, a second set of tokens associated with a field of the second document, the field of the second document associated with the type of information; and comparing the first set of tokens to the second set of tokens, and disqualifying the candidate document if the candidate document does not describe similar subject matter as to the first document according to the comparison; and providing a set of duplicate documents, wherein the set of duplicate documents includes candidate documents that have scores above the threshold, and that have not been disqualified.

31. The computer-readable medium of claim 30, wherein executing the non-fielded relevance search on the token index comprises executing the non-fielded relevance search on the token index using the least frequently occurring tokens of the generated set of tokens for the first document.

32. The computer-readable medium of claim 30, wherein the method further comprises sorting the generated set of tokens for the first document according to an occurrence frequency in the first document, selecting tokens with an occurrence frequency lower than a frequency threshold, and executing the non-fielded relevance search on the token index using the selected tokens.

33. The computer-readable medium of claim 30, wherein refining the scores for each candidate document to include matching of non-identical terms not considered as matches in the non-fielded relevance search comprises refining the scores for each candidate document to include matching of abbreviated and non-abbreviated character strings.

34. The computer-readable medium of claim 30, wherein refining the scores for each candidate document to include matching of non-identical terms not considered as matches in the non-fielded relevance search comprises refining the scores for each candidate document to include matching of misspelled and non-misspelled character strings.

35. The computer-readable medium of claim 30, wherein performing domain specific comparisons comprises comparing product numbers from the first document and the candidate document.

36. The computer-readable medium of claim 30, wherein performing domain specific comparisons comprises comparing package quantities identified in the first document to package quantities identified in the candidate document.

37. The computer-readable medium of claim 30, wherein performing domain specific comparisons comprises comparing the provider of the first document to the provider of the candidate document, and if the provider of the first document is substantially similar to the provider of the second document, the candidate document is disqualified as a candidate document.

38. The computer-readable medium of claim 30, wherein the score for each candidate document corresponds to a determined likelihood the candidate document is a similar to and considered a duplicate of the first document.

* * * * *